US006324966B1

(12) United States Patent
Joergensen

(10) Patent No.: US 6,324,966 B1
(45) Date of Patent: Dec. 4, 2001

(54) PISTON COFFEE MAKER FOR PREPARING COFFEE IN SMALL AMOUNTS

(75) Inventor: Carsten Joergensen, Niklausen (CH)

(73) Assignee: PI-Design AG, Triengen (CH)

(*) Notice: Subject to any disclaimer, the term of this patent is extended or adjusted under 35 U.S.C. 154(b) by 0 days.

(21) Appl. No.: 09/485,235

(22) PCT Filed: Aug. 7, 1998

(86) PCT No.: PCT/DK98/00344

§ 371 Date: Apr. 17, 2000

§ 102(e) Date: Apr. 17, 2000

(87) PCT Pub. No.: WO99/07266

PCT Pub. Date: Feb. 18, 1999

(30) Foreign Application Priority Data

Aug. 7, 1997 (DK) .......................................... 1997 00304 U
Oct. 23, 1997 (DK) .................................................... 1208/97

(51) Int. Cl.[7] .................................................. A47J 31/38
(52) U.S. Cl. ............................................ 99/297; 99/287
(58) Field of Search .................... 99/297, 287; 220/410, 220/412, 413, 756, 762

(56) References Cited

U.S. PATENT DOCUMENTS

| 1,346,485 | * | 7/1920 | Arrigunaga | 99/297 |
| 3,935,318 | * | 1/1976 | Mihailide | 99/297 X |
| 5,570,623 | * | 11/1996 | Lin | 99/297 X |
| 5,761,987 | * | 6/1998 | Leon et al. | 99/297 |
| 5,770,074 | * | 6/1998 | Pugh | 99/297 X |
| 5,809,867 | * | 9/1998 | Turner et al. | 99/297 |

* cited by examiner

Primary Examiner—Reginald L. Alexander
(74) Attorney, Agent, or Firm—Nath & Associates PLLC; Gary M. Nath; Marvin C. Berkowitz

(57) ABSTRACT

A piston-type coffee maker is disclosed having a cylindric container, a lid, a piston with piston rod and a handle, where the piston is made as a filter for the ground coffee. The piston coffee maker is adapted for making a single cup of coffee and for keeping the temperature of the infusion fluid at a suitable level during preparation of the coffee. The piston coffee maker is also adapted to be manufactured at low cost. The walls, lid and bottom of cylindrical container are made heat isolating. An upper rim of the cylindrical container has a locking member that cooperatively engages a corresponding locking member on the lid.

8 Claims, 5 Drawing Sheets

PISTON COFFEE MAKER FOR PREPARING COFFEE IN SMALL AMOUNTS

FIELD OF THE INVENTION

The present invention relates to a piston coffee maker with cylindrical container, a lid, a piston with piston rod and a handle, where the piston is made as a filter for the ground coffee, where the walls, the lid and the bottom in the cylindrical container are made heat isolating, and where the piston coffee maker is particularly suitable for preparing coffee in small amounts for, say, one person.

BACKGROUND OF THE INVENTION

It has for ages been known, that for preparing coffee different devices and methods could be applied, where the perspective reaches from a blue, enamelled jug with matching fabric bag to espresso devices, where steam under high pressure is lead through the ground coffee beans. From approximately mid 1970'es a piston coffee maker has been known and widely distributed in Denmark, and such piston coffee makers have been made in varying sizes covering expected needs from 3 and up to 12 persons.

From U.S. Pat. No. 1,346,485 a device for preparing small amounts of beverages, such as coffee or tea, is known to have a container being enclosed by a heat insulating casing, which is composed of a lower portion and a cover portion. Here the container and the casing are made of different materials and are therefore made in individual processes, thereby creating problems of fitting together and tolerances. Such production is expensive as partly a large percentage of loss can be anticipated, and partly a large staff is needed for handling and quality control.

From U.S. Pat. No. 5,809,867 it is known to dress the container with an isolating jacket. Also here, the container and the jacket are made of different materials and are therefore made in individual processes, thereby creating problems of fitting together and tolerances. Like the previous mentioned state of the art, the manufacture is expensive with a large percentage of loss and a large staff needed for handling and quality control.

It has never been possible—even in small piston coffee makers—to prepare smaller portions of coffee, as the dimensions result in an unfavourable relation between the total surface and the volume of the infusion fluid, taking into consideration that Stephan-Bolzmanns law for temperature emission, where the radiated energy through a surface is reversed proportional to the volume of the body and proportional with the area of the surface and with the absolute temperature in fourth power, is also valid for such small bodies. This has, until now—including the mentioned state of the art, caused that the infusion fluid during the preparation delivered a large amount of the heat to the environment, whereby the temperature diminished before the coffee had delivered its aromatic compounds to the infusion fluid. This has obviously been to the disadvantage of drinking the coffee. Further, it has been uneconomic to produce a piston coffee maker for only one person, as the expenses for that have been exorbitant, as tools, assembling and packaging by and large are independent of the size of a piston coffee maker.

SUMMARY OF THE INVENTION

The inventor has therefore set his goal to make a piston coffee maker of the above mentioned kind, where with the piston coffee maker small portions for a single cup can be made, and where the piston coffee maker is capable of keeping the temperature of the infusion fluid on a suitable level during the preparation of the coffee, and where production costs for the piston coffee maker are small.

This task is according to the invention solved by, the walls and the bottom in the cylindrical container are made as a double construction, like double walls and double bottoms, where the upper rim is equipped with locking means, and the lid is provided with corresponding locking means with a view to having the lid sealingly locked on the piston coffee maker, and that the piston coffee maker has the form of a drinking cup, where in the lid there is partly a depression, the size of which is sufficient for containing the pressure handle on the piston rod in the piston coffee maker, and partly a drinking edge in combination with a drinking opening.

With a piston coffee maker according to the invention a favourable relation between the heat transmission of the outer surface and the volume of the infusion fluid is secured, whereby the temperature of the infusion fluid can be optimally maintained during the infusion, i.e. over 96° C. by having the walls and the bottom in the cylindrical container made as a double construction like double walls and double bottoms. Thereby, all essential aromatic oils for the coffee drink are extracted from the ground coffee. The container can be made by precision injection moulding of plastics, whereby very small tolerances in the finished container are achieved. A further advantage is achieved in that the sealing between the filter in the piston and the container wall can be established with simple and economic propitious means so that the production cost for the finished piston coffee maker can be kept low. Further, such injection moulded construction allows, for further insulation of walls and bottom, by introduction of insulating material between the double walls in the double constructions. Such insulating material can have either the same shape as the one injection moulding matrix, so that it fits precisely to the space between the double walls and the bottom, or it can be achieved by injecting polyurethane foam in the cavity, which latter method seems to be the most economic and appropriate method for insulating the piston coffee maker.

In an appropriate elaboration the piston coffee maker has the form of a drinking cup, where in the lid can be found partly a depression, the size of which is sufficient for containing the pressure handle on the piston rod in the piston coffee maker, and partly a drinking edge and a drinking opening. Thereby it is secured, that the piston coffee maker can be stabled during storage, and that its need for space has diminished. Further, by having the coffee maker made like a drinking cup, heat is saved in that some part of the heat of the coffee is not used for heating a drinking cup, inasmuch as the coffee maker is indeed the drinking cup.

It is favourable, if the drinking opening in the lid can be closed by a cover. Thereby, after preparation, further drop in the temperature caused by evaporation from the coffee drink can be avoided. In that connection it is a is practical arrangement, if the cover is pivotably fastened on the pressure handle of the piston rod. Thereby, it can be avoided, that the cover will be mislaid, and it is thereby present at any time, when the need for closure arise. With a view to opening and closure of the cover this is equipped with an operating handle reaching out over the drinking edge. Thereby, the use of the cover is substantially eased, and as it is pivotably fastened, it can be operated with one hand, which might be practical in some situations.

In an embodiment of the piston coffee maker the depression in the lid can be gradually decreased from the area around the drinking opening until it is flush with the drinking edge opposite the area around the drinking opening. Thereby, there is a possibility of fastening the pressure handle on the piston in a safe way, so that it is sealing the lid and does not drop out, when the user of the piston coffee maker is drinking of the drinking edge. When the piston be lifted, the cover of the drinking opening can be used as handle for pulling up the piston from the depression.

A more favourable embodiment of the piston coffee maker is provided by the cylindrical container having an elliptic cross section, and by having the piston rod connected to a not shown closing device on top of the filter, and by the piston rod being pivotable around its axis. Thereby, it is secured, that the filter can not rotate relative to the container, and that by turning the piston rod an infusion barring between the coffee drink and the degenerated coffee grounds can be established, whereby further infusion is avoided. It can, in this connection, be suitable, if the eccentricity of the piston cross section is not too as a too large eccentricity will present a more unfavourable relation between the volume and the surface.

The invention together with further embodiments is disclosed more specifically in the following specification with reference to the examples of embodiments shown in the drawing, which is showing on:

DETAILED DESCRIPTION OF THE INVENTION

Figure 1:
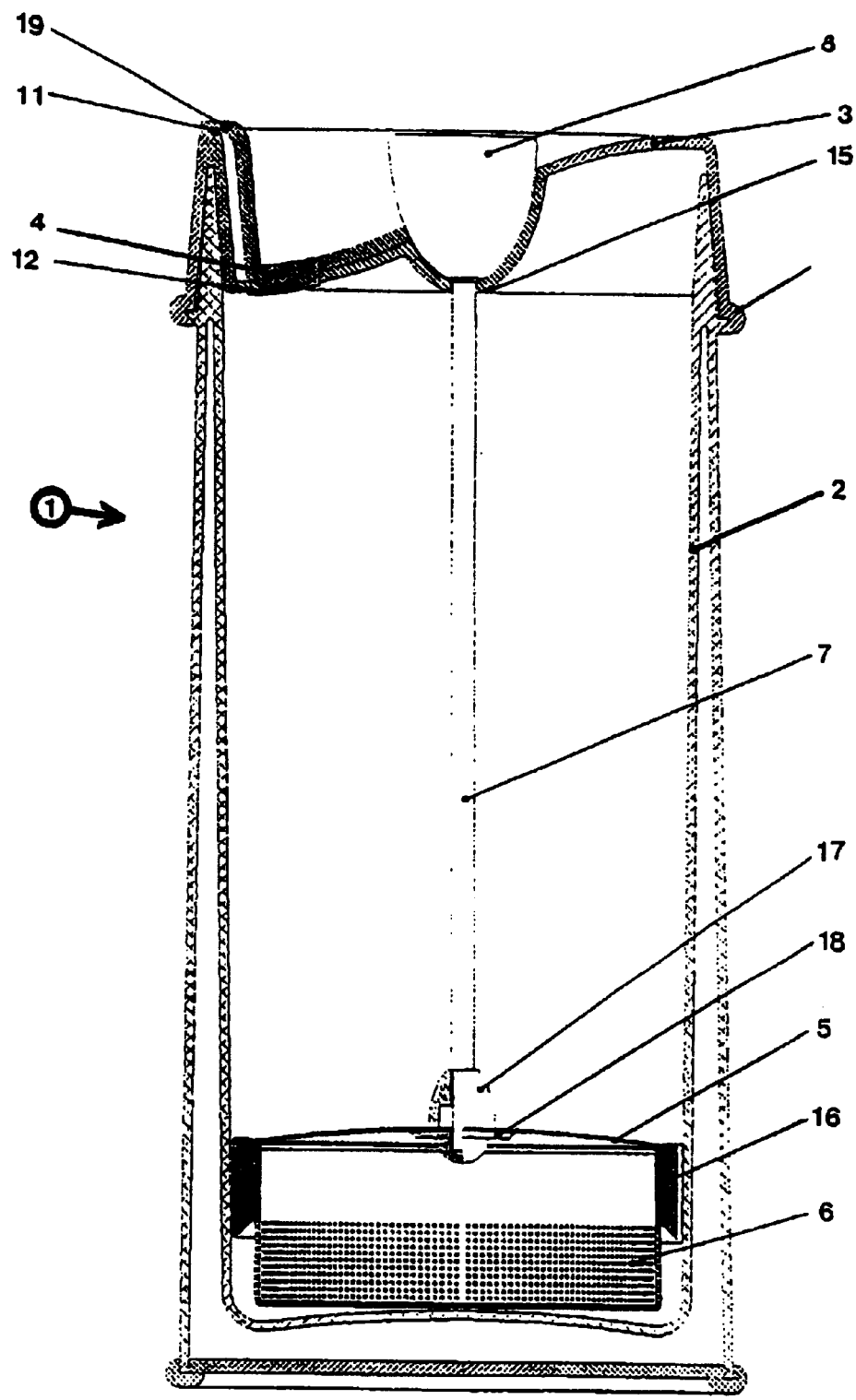
FIG. 1 a piston coffee maker according to the invention in a partly sectional view, FIG. 2 the piston coffee maker with elevated piston, FIG. 3 the piston coffee maker seen from above with closed cover, FIG. 4 the piston coffee maker seen from above with open cover, and FIG. 5 a sectional view of a different embodiment of the piston coffee maker according to the invention.

A piston coffee maker 1 according to the invention is shown on FIG. 1 with the container 2, the lid 3 together with its cover 4. Further, the piston 5 with the filter 6 sealing against the cylindrical container wall by a seal ring 16, and a piston rod 7 being fastened in the piston 5 by retaining devices 17, 18, and reach up through the lid 3 through a hole in a depression 15, and over the lid 3 is provided with a pressure handle 8. From the sectional drawing it is seen, that the pressure handle 8 can be guided down below the upper limitation of the lid 3. In this position the piston rod 7 or the pressure handle 8 can be locked to the lid 3 by a not shown snap lock, so that the piston does not unintentionally slide out.

The piston coffee maker is in the presently shown embodiment at the top equipped with a bead 9 round about the outside, where the lid 3 can engage with the bead 9 through a groove 10 all the way round on the inside of the skirt 14 of the lid. The specific shape of the locking means is immaterial in this connection, as such locking means can be worked out in many ways.

Also, in FIG. 1 a cover 4 is shown being capable of closing the drinking opening 12 and thereby impede evaporation of the contents in the piston coffee maker 1. The cover 4 is here pivotably fastened on the pressure handle 8 for the piston 5. Thereby it is secured, that the cover is always present when needed. and that the cover also favourably can be used as a pulling handle, when the piston 5 should be lifted up from its lowest position. This is particularly needed, if the piston is held in its lowest position by a snap lock not shown in the drawing, preventing that the piston slides into the face of the person drinking, when the piston coffee maker shaped as a drinking cup is almost empty. It goes without saying that the cover cannot be used during the infusion itself, but as soon as the piston has been pressed down to its lowest position, the cover 4 can swing down and close the drinking opening 12.

In an embodiment of the piston coffee maker, where the piston e.g. has an elliptical cross section, the cover can, after the infusion, further serve as a rotary handle for the rotation of the piston rod around its own axis, whereby an infusion barring can be achieved between coffee grounds and coffee drink. Here, it would be practical if the cover's 4 position over the drinking opening 12 corresponds to the situation that the infusion barring between coffee grounds and coffee drink has been established.

Figure 2:
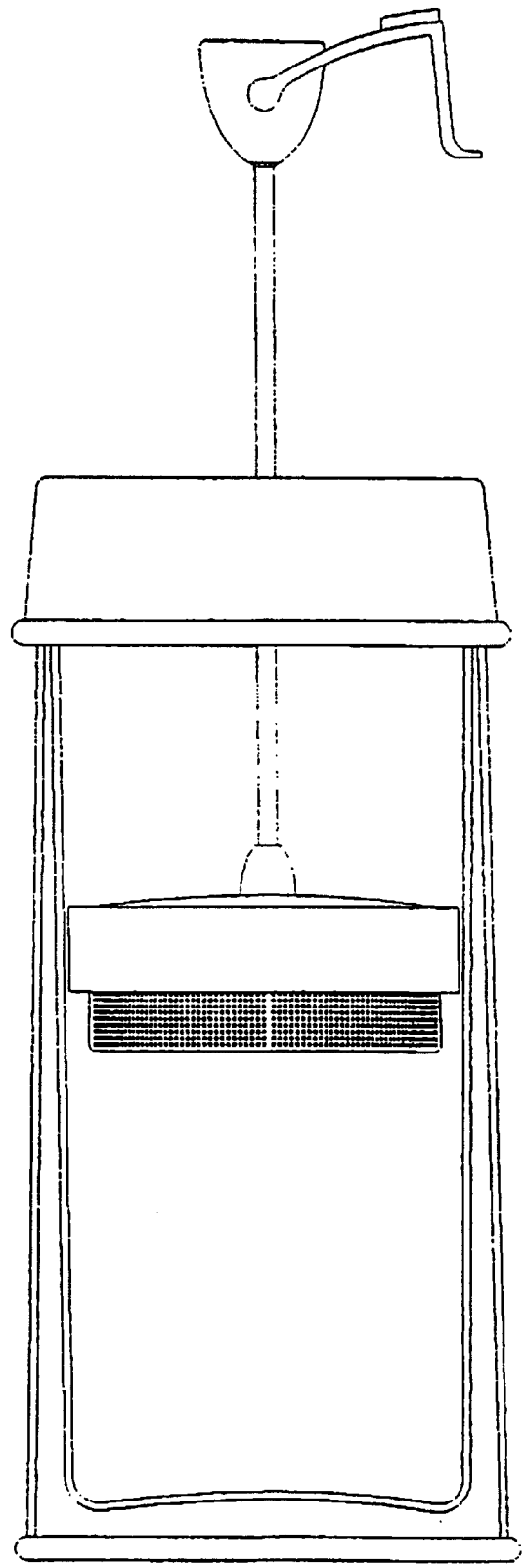

In FIG. 2 the piston coffee maker is shown with elevated piston. Here, the piston coffee maker is shown as seen by an observer, whereas FIG. 1 is a sectional view. In the figure the piston is seen in an elevated position, where the infusion normally takes place. The cover 4 is here swung up so that it will not close the drinking opening 12, when the piston is pressed down.

Figure 3:
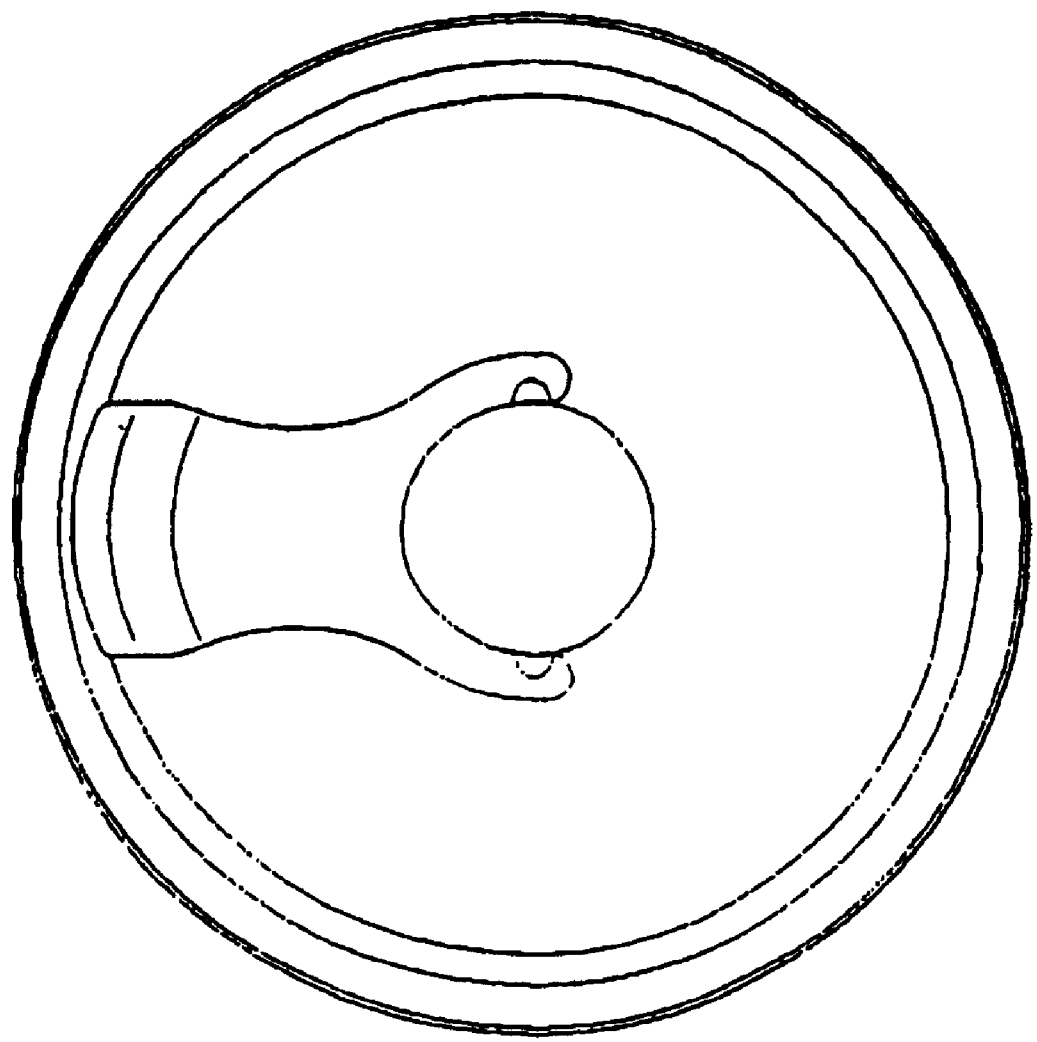
Figure 4:
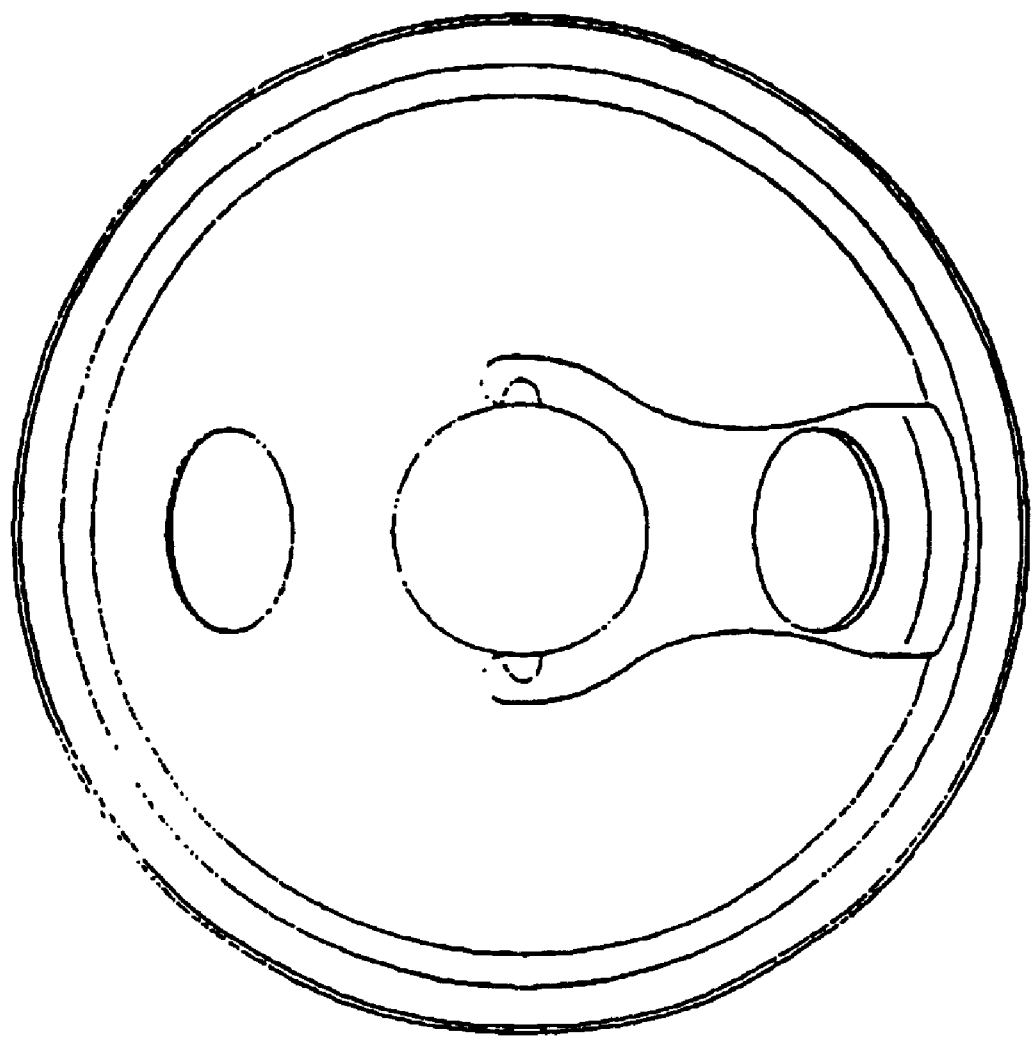

FIGS. 3 and 4 show the piston coffee maker as seen from above with closed and open cover, respectively, whereby it can be seen that this embodiment refers to the embodiment with a cylindrical container having a circular cylinder cross section. However, the cylinder cross section, which can also elliptical, is immaterial for showing the cover 4 and its opening and closing.

Figure 5:
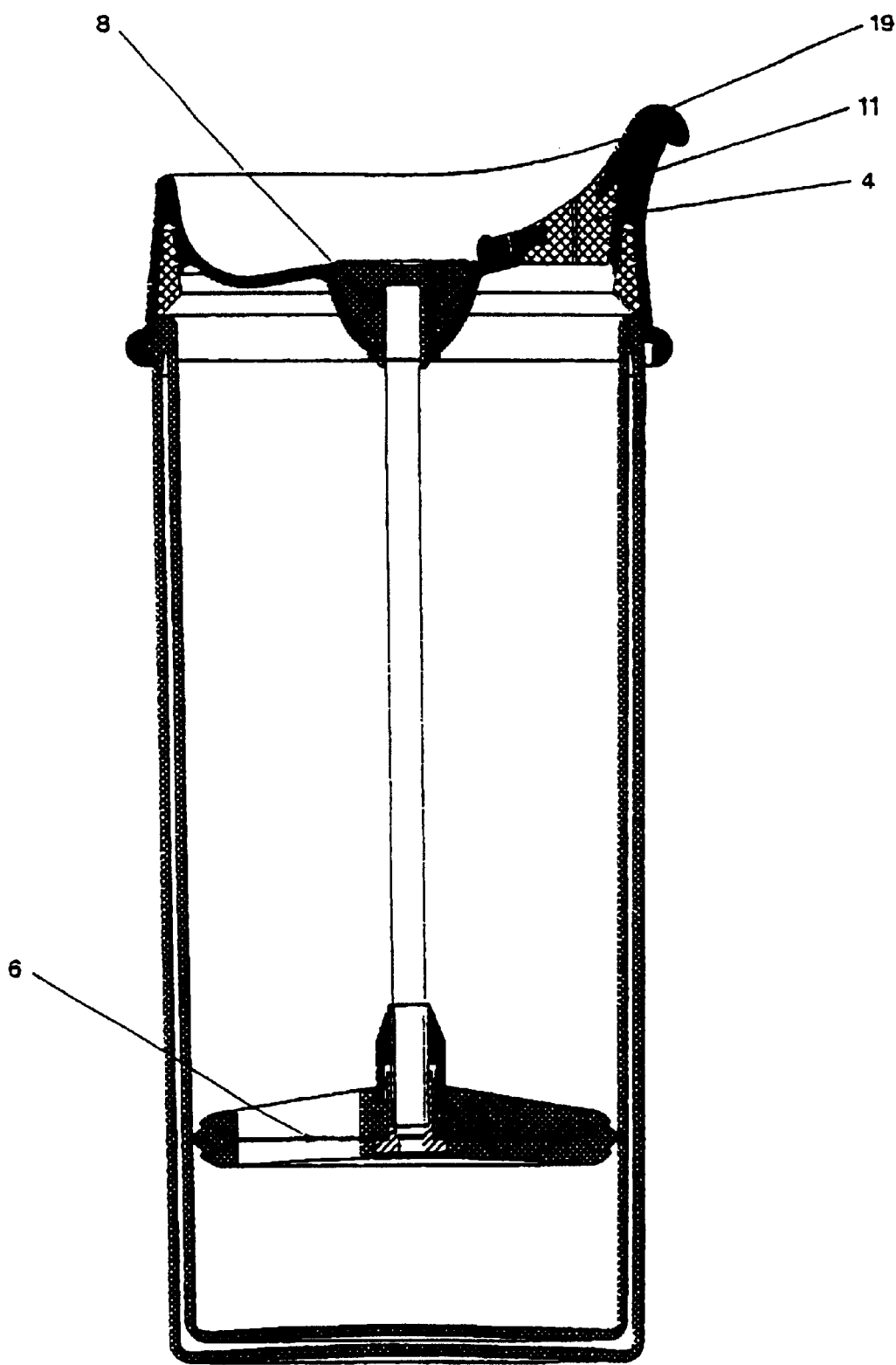

FIG. 5 shows a sectional view of a different embodiment of the piston coffee maker according to the invention, where the drinking opening is arranged at an elevation of the lid's drinking edge, and where the cover is hinged directly on top of the lid. Here the locking means between the lid and the container are achieved by a threaded closure, whereby the lid easily can be mounted or removed. This has, however, as a consequence that the cross section of the container 2 at the upper rim must be circular. As a result of the large precision at injection moulding the sealing of the piston against the container wall can, however, also here be a simple seal ring.

What is claimed is:

1. A piston Piston coffee maker comprising a cylindrical container having walls, a lid, a piston with a piston rod and a handle, wherein the piston further comprises a filters, and the walls, the lid and a bottom of the cylindrical container are heat isolating, characterised in that:

the walls and the bottom of the cylindrical container have a double layer construction;

an upper rim of the cylindrical container has a first locking means;

the lid has a second locking means, that cooperatively engages said first locking means, and a depression in which a pressure handle connected to the piston rod can be disposed, and a drinking edge having a drinking opening;

wherein the piston coffee maker has the form of a drinking cup.

2. The piston coffee maker according to claim 1, further comprising insulating material disposed between the respective layers of the double layer construction.

3. The piston coffee maker according to claim 1, characterised in that the drinking opening can be closed by a cover.

4. The piston coffee maker according to claim 3, characterised in that the cover is pivotably fastened to the pressure handle of the piston rod.

5. The piston coffee maker according to claim 3, characterised in that the cover has an operating handle reaching that extends out over the drinking edge.

6. The piston coffee maker according to claim 1, characterised in that a depth of the depression in the lid gradually decreases from a first depth in a first area around the drinking opening until it is flush with the drinking edge in a second area opposite the drinking opening.

7. The piston coffee maker according to claim 1, characterised in that:

> the cylindrical container has an elliptical cross section; and
>
> the piston rod being is pivotable around its axis, and is connectable to a closing device on top of the filter.

8. The piston coffee maker according to claim 1, characterised in that the cover is pivotably fastened on the lid.

* * * * *

UNITED STATES PATENT AND TRADEMARK OFFICE
CERTIFICATE OF CORRECTION

PATENT NO. : 6,324,966 B1 Page 1 of 1
DATED : December 4, 2001
INVENTOR(S) : Carsten Joergensen It is certified that error appears in the above-identified patent and that said Letters Patent is hereby corrected as shown below:

<u>Claim 1,</u>
Line 1, delete "Piston";

<u>Claim 5,</u>
Line 2, delete "reaching";

<u>Claim 7,</u>
Line 5, delete "being".

Signed and Sealed this

Twenty-sixth Day of March, 2002

*Attest:*

JAMES E. ROGAN
*Attesting Officer*     *Director of the United States Patent and Trademark Office*